(12) United States Patent
Kanemitsu et al.

(10) Patent No.: US 6,536,253 B1
(45) Date of Patent: Mar. 25, 2003

(54) SLOTTING METHOD, SLOTTING DEVICE, AND METHOD OF MANUFACTURING METAL SHEET BRAKE SHOE BY SLOTTING

(75) Inventors: Toshiaki Kanemitsu, Kobe (JP); Shuji Kanemitsu, Kobe (JP)

(73) Assignee: Kanemitsu Corporation, Akashi (JP)

( * ) Notice: Subject to any disclaimer, the term of this patent is extended or adjusted under 35 U.S.C. 154(b) by 0 days.

(21) Appl. No.: 09/926,305

(22) PCT Filed: Mar. 10, 2000

(86) PCT No.: PCT/JP00/01447

§ 371 (c)(1),
(2), (4) Date: Oct. 11, 2001

(87) PCT Pub. No.: WO01/66278

PCT Pub. Date: Sep. 13, 2001

(51) Int. Cl.[7] .............................................. B21D 22/14
(52) U.S. Cl. ........................... 72/71; 72/82; 29/894.362
(58) Field of Search ................ 72/71, 82, 110, 72/379.2; 29/894.362

(56) References Cited

U.S. PATENT DOCUMENTS

| 3,540,395 A | | 11/1970 | Skinner | |
| 3,893,818 A | * | 7/1975 | Mickus | 72/71 |
| 6,105,410 A | * | 8/2000 | Sauberlich et al. | 72/71 |

FOREIGN PATENT DOCUMENTS

| JP | 62-84845 | * | 4/1987 | 72/71 |
| JP | 3-20154 | | 1/1991 | |
| JP | 6-210361 | | 8/1994 | |
| JP | 2520095 | | 5/1996 | |
| JP | 9-122816 | | 5/1997 | |
| WO | WO 94/09928 | | 5/1994 | |

* cited by examiner

Primary Examiner—Ed Tolan
(74) Attorney, Agent, or Firm—Jones, Tullar & Cooper, P.C.

(57) ABSTRACT

The present invention provides a slotting method in which, during production of a metal sheet V-pulley or the like, slitting can be correctly easily performed at an arbitrary position in the thickness direction of an outer peripheral face of a blank. A blank housing recess (5) a depth of which is smaller than the thickness of a disk-like metal blank (1) is formed in an upper face of a lower rotary die (4) on which the blank (1) is to be placed, and a roller die guiding face (6) which is lower in level than an upper face of the blank (1) in the blank housing recess (5) is horizontally formed in an outer periphery of the blank housing recess (5). The slotting roller die (11) has a blade edge (12) on its outer periphery, and, while the slotting roller die is rotated in synchronization with the blank (1) about the roller axis which is inclined with respect to the rotation axis of the upper and lower rotary dies (4), the blade edge (12) is slid on the roller die guiding face (6) in an inward radial direction to be pressed against an outer peripheral portion (10) of the blank (1) which is protruded from the blank housing recess (5), whereby the outer peripheral portion (10) is slit into two parts in the thickness direction to form slotted parts (10a, 10b).

5 Claims, 7 Drawing Sheets

SLOTTING METHOD, SLOTTING DEVICE, AND METHOD OF MANUFACTURING METAL SHEET BRAKE SHOE BY SLOTTING

This application is a 35 USC 371 of PCT/JP00/01447, filed Mar. 10, 2000.

TECHNICAL FIELD

The present invention relates to a slotting method in which, during production of a metal sheet V-pulley, a metal sheet brake shoe, or the like, an outer peripheral portion of a blank is split into two parts in the thickness direction, a slotting device, and a method of manufacturing a metal sheet brake shoe by slotting.

BACKGROUND ART

As a slotting method in which, during production of a metal sheet V-pulley, an outer peripheral portion of a disk-like blank is split into two parts in the thickness direction, for example, a slotting method is disclosed in Japanese Patent No. 2520095. In the slotting method, the outer peripheral portion of a disk-like metal blank is slit in the thickness direction into two parts by a slotting roller die. In the slotting roller die used in the method, an edge-like blade portion is protruded in the circumferential direction in an axial center portion of the outer peripheral face. While pressing the edge-like blade portion against a center portion in the thickness direction of the outer peripheral face of the blank, the slotting roller die and the blank are synchronously rotated, whereby the outer peripheral portion of the blank is slit into two parts in the thickness direction.

In the above-mentioned slotting method, the edge of the blade portion of the slotting roller die easily slips over the outer peripheral face of the blank in the thickness direction during an initial stage of the slotting process, and hence it is not easy to slot the outer peripheral face of the blank at an arbitrary position in the thickness direction. In the case where a thin blank is used, particularly, instability and difficulty of centering and equal slitting in the process of slotting a center portion in the thickness direction of the outer peripheral face of the blank are conspicuous.

It is an object of the invention to provide a slotting method in which slitting can be correctly easily performed at an arbitrary position in the thickness direction of an outer peripheral face of a blank, a slotting device for the method, and a method of manufacturing a metal sheet brake shoe by slotting.

DISCLOSURE OF INVENTION

The slotting method of the invention is a slotting method in which a disk-like metal blank is clampingly held between upper and lower rotary dies, a slotting roller die is pressed against an outer peripheral portion of the blank, and the outer peripheral portion of the blank is split into two parts in a thickness direction, wherein a blank housing recess a depth of which is smaller than a thickness of the blank is formed in an upper face of the lower rotary die on which the blank is to be placed, a roller die guiding face is formed horizontally and continuously with an outer periphery of an upper end of an outer peripheral wall of the blank housing recess to be lower in level than an upper face of the blank in the blank housing recess, the upper rotary die is formed to have an outer diameter which is smaller than an outer diameter of the lower rotary die, thereby allowing an upper face of the outer peripheral portion of the blank in the blank housing recess to be exposed, the slotting roller die has a blade edge on an outer periphery of the die, and, while the slotting roller die is rotated in synchronization with the blank about a roller axis which is inclined with respect to a rotation axis of the upper and lower rotary dies, the blade edge is slid on the roller die guiding face in an inward radial direction to be pressed against the outer peripheral portion of the blank which is protruded from the blank housing recess, whereby the outer peripheral portion is slit into two parts in the thickness direction.

According to this method, slotting can be surely performed at a position (slotting position) which is in the outer peripheral portion of the blank protruded from the blank housing recess of the lower rotary die, and which coincides with the level of the roller die guiding face, without causing a positional displacement by the blade edge of the slotting roller die which is slid along the roller die guiding face. When the outer peripheral portion of the blank is to be slit into two parts of the same thickness in the thickness direction, for example, the center portion in the thickness direction of the outer peripheral portion of the blank can be therefore surely slotted simply by housing the blank in the blank housing recess so that only a portion of a half of the thickness of the blank is protruded. Namely, when the blank is housed in the blank housing recess so that a desired slotting position of the outer peripheral portion of the blank corresponds to the level of the roller die guiding face, slitting can be performed correctly and easily at an arbitrary position in the thickness direction of the outer peripheral portion of the blank. Under a state where the whole of the blank including an outer peripheral portion is supported in the housing recess of the lower rotary die, the outer peripheral portion of the blank can be slotted stably and surely. Therefore, the method is optimum for slotting an outer peripheral portion of a blank of a reduced thickness.

In the slotting method of the other invention, after an outer peripheral portion of a blank which is protruded from a blank housing recess of a lower rotary die is slotted into two parts in a thickness direction to form upper and lower slotted parts by a blade edge of a slotting roller die in the same manner as the above-mentioned slotting method, the blank is further clampingly held between second upper and lower rotary dies so that the upper and lower slotted parts are outward protruded from outer peripheral faces of the upper and lower rotary dies, and an expanding blade portion of an expandingly forming roller die is pressed against the slotted parts, the expanding blade portion being formed on an outer peripheral face in a circumferential direction, to straight expand the slotted parts in upward and downward directions.

According to this method, it is possible to easily produce a slotted product of a shape having: a web which is configured by a part of the blank that is clamped between the second upper and lower rotary dies; and rims which are configured respectively by the slotted parts that are formed continuously with an outer peripheral portion of the web.

The slotting device of the other invention is a slotting device comprising: upper and lower rotary dies which clampingly hold a disk-like metal blank; and a slotting roller die which, while being rotated in synchronization with the blank, presses a blade edge against an outer peripheral portion of the blank to slit the outer peripheral portion into two parts in a thickness direction, wherein a blank housing recess a depth of which is smaller than a thickness of the blank is formed in an upper face of the lower rotary die on which the blank is to be placed, a roller die guiding face is formed horizontally and continuously with an outer periphery of an upper end of an outer peripheral wall of the blank housing recess to be lower in level than an upper face of the blank in the blank housing recess, the upper rotary die is formed to have an outer diameter which is smaller than an outer diameter of the lower rotary die, to allow an upper face of the outer peripheral portion of the blank in the blank housing recess to be exposed, the slotting roller die has a blade edge on an outer periphery of the die, and, while the slotting roller die is rotated in synchronization with the blank about a roller axis which is inclined with respect to a rotation axis of the upper and lower rotary dies, the blade edge is slid on the roller die guiding face in an inward radial direction to be pressed against the outer peripheral portion of the blank which is protruded from the blank housing recess.

As a result of the use of the device, when the blank is housed in the blank housing recess so that a desired slotting position of the outer peripheral portion of the blank corresponds to the level of the roller die guiding face, slitting can be performed correctly at an arbitrary position in the thickness direction of the outer peripheral portion of the blank.

Furthermore, the method of manufacturing a metal sheet brake shoe of the other invention is a method of, by using a disk-like metal blank, manufacturing a metal sheet brake shoe having a shoe rim which has a partially arcuate shape, and a shoe rib which is protruded from an inner periphery of the shoe rim, and includes: the slotting step of splitting an outer peripheral portion of the blank which is protruded from a blank housing recess of a lower rotary die, by a blade edge of a slotting roller die into two parts in a thickness direction to form upper and lower slotted parts; an expandingly forming step in which the blank is clampingly held between second upper and lower rotary dies so that the upper and lower slotted parts are outward protruded from outer peripheral faces of the upper and lower rotary dies, and an expanding blade portion of an expandingly forming roller die is pressed against the slotted parts, the expanding blade portion being formed on an outer peripheral face in a circumferential direction, to straight expand the slotted parts in upward and downward directions, thereby shaping a web which is configured by a part of the blank clamped between the upper and lower rotary dies, and rims which are configured respectively by the slotted parts that annularly expand toward both sides in a thickness direction of an outer peripheral portion of the web; and a step of cutting the web and the rims into a required shape, thereby forming a brake shoe having a shoe rim which has a partially arcuate shape, and a shoe rib which is protruded from an inner periphery of the shoe rim.

According to the method, a metal sheet brake shoe having a shoe rim which has a partially arcuate shape, and a shoe rib which is protruded from an inner periphery of the shoe rim can be easily produced from a disk-like metal blank.

BEST MODE FOR CARRYING OUT THE INVENTION

Figure 1A:
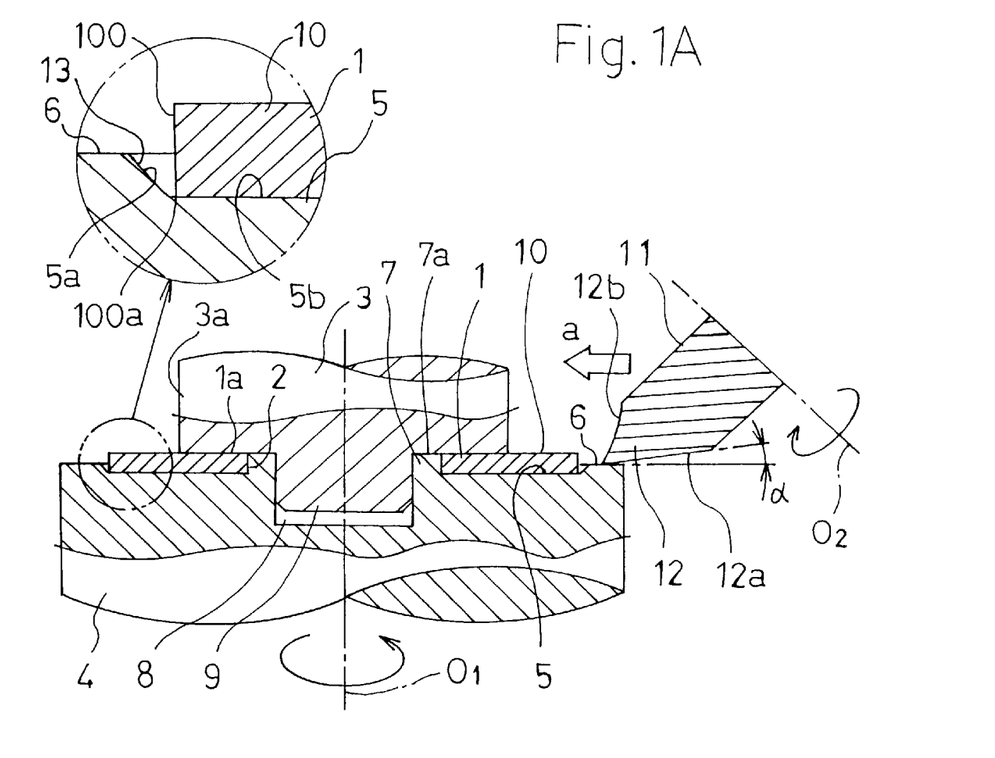
FIG. 1A is a diagram illustrating a state before a slotting process of a slotting step in the slotting method.

In the slotting method of the invention, first, a metal blank 1 such as a steel plate which is formed into a disk-like shape by a press forming as shown in FIG. 1A is used in a slotting step. A center hole 2 is formed in the blank 1. The blank 1 is clampingly held between a first upper rotary die 3 and a lower rotary die 4. A blank housing recess 5 for housing the blank 1 is annularly formed in the upper face of the lower rotary die 4 on which the blank 1 is to be placed. A roller die guiding face 6 is formed horizontally and continuously with the outer periphery of the upper end of an outer peripheral wall 5a of the blank housing recess 5.

An annular boss 7 onto which the center hole 2 of the blank 1 is to be fitted is formed in the inner periphery side of the blank housing recess 4 so that the center of the boss coincides with the rotation axis of the upper and lower rotary dies 3, 4, and the upper face 7a of the boss 7 is flush with the upper face 1a of the blank 1 in the blank housing recess 5. A protrusion 9 which is protruded from the center of the lower face of the lower rotary die 2 is to be concentrically fitted into a center recess 8 surrounded by the annular boss 7.

The outer diameter of the upper rotary die 3 is smaller than that of the lower rotary 4 so that an outer peripheral portion 10 of the blank 1 in the blank housing recess 5 is exposed in a range which is outer than the outer peripheral face 3a of the upper rotary die 3 in the extent corresponding to a slotting depth of a predetermined degree.

The depth of the blank housing recess 5 is smaller than the thickness of the blank 1 so that, when the blank 1 is housed, the upper face 1a of the blank 1 is upward protruded from the roller die guiding face 6. A position of the outer peripheral portion 10 of the blank 1 in the blank housing recess 5 which coincides with the level of the roller die guiding face 6 serves as a slotting position. In specific relationships between the thickness of the blank 1 and the depth of the blank housing recess 5, when slotting is to be performed on a center portion in the thickness direction of the outer peripheral portion 10 of the blank 1, for example, the blank 1 is therefore housed in the blank housing recess 5 so that only a portion of a half of the total thickness is upward protruded from the roller die guiding face 6. In the case where the outer peripheral portion 10 of the blank 1 is to be slotted at a thickness ratio of 1:2 with respect to the thickness direction, the blank 1 is housed in the blank housing recess 5 so that a portion of a thickness which is ⅓ or ⅔ of the total thickness is upward protruded from the roller die guiding face 6. Namely, slotting can be performed at an arbitrary position in the thickness direction of the outer peripheral portion 10 of the blank 1 by changing the degree of protrusion of the blank 1 from the blank housing recess 5.

In the slotting step, a slotting roller die 11 is prepared. The slotting roller die 11 has a blade edge 12 of a substantially V-like section shape, in the outer periphery. The blade edge 12 is placed on one side of the upper and lower rotary dies 3, 4 so as to be radially slid to be movable advanceably and retractably on the roller die guiding face 5 of the lower rotary die 4. In this case, the slotting roller die 11 is placed so that the roller axis $O_2$ is inclined with respect to the rotation axis $O_1$ of the upper and lower rotary dies 3, 4, thereby allowing the outer peripheral portion 10 of the blank 1 to be easily slotted by the blade edge 12. A clearance angle $\alpha$ (for example, about 5°) is formed in order to prevent the back 12a of the blade edge 12 from colliding against the roller die guiding face 6 to seize up. In order to prevent from the blade edge 12 from seizing, a lubricant of high abrasion resistance may be applied to the roller die guiding face 6. The face 12b of the blade edge 12 is formed as a concave surface.

Figure 1B:
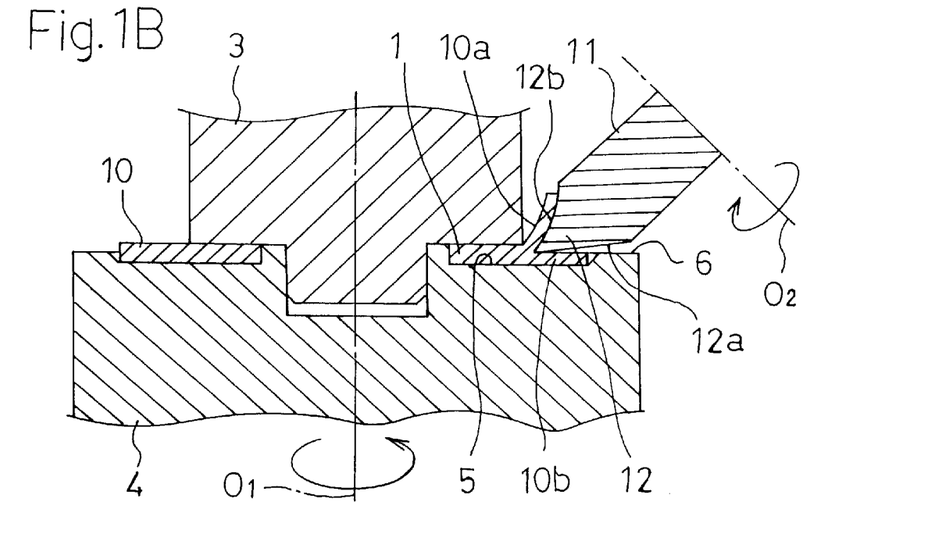
FIG. 1B is a diagram illustrating the operation of the slotting step in the slotting method.

In the slotting process, while the slotting roller die 11 and the blank 1 are synchronously rotated, the slotting roller die 11 is moved to approach the outer peripheral portion 10 of the blank 1 as indicated by the arrow a in FIG. 1A to slide the blade edge 12 on the roller die guiding face 6 in an inward radial direction, whereby the blade edge 12 is pressed against the outer peripheral portion 10 of the blank 1 which is protruded from the blank housing recess 5 in the outside of the upper rotary die 3, to split the outer peripheral portion 10 into two parts in the thickness direction. An upper slotted part 10a which is scooped by the face 12b of the blade edge 12 on one side with sliding thereon is raised so as to be separated from a lower slotted part 10b which is in the blank housing recess 5 on the other side. FIG. 1B shows the slotted state. In this case, slotting can be performed at an arbitrary position in the thickness direction of the outer peripheral portion 10 of the blank 1 by changing the degree of protrusion of the blank 1 from the blank housing recess 5.

Figure 4:
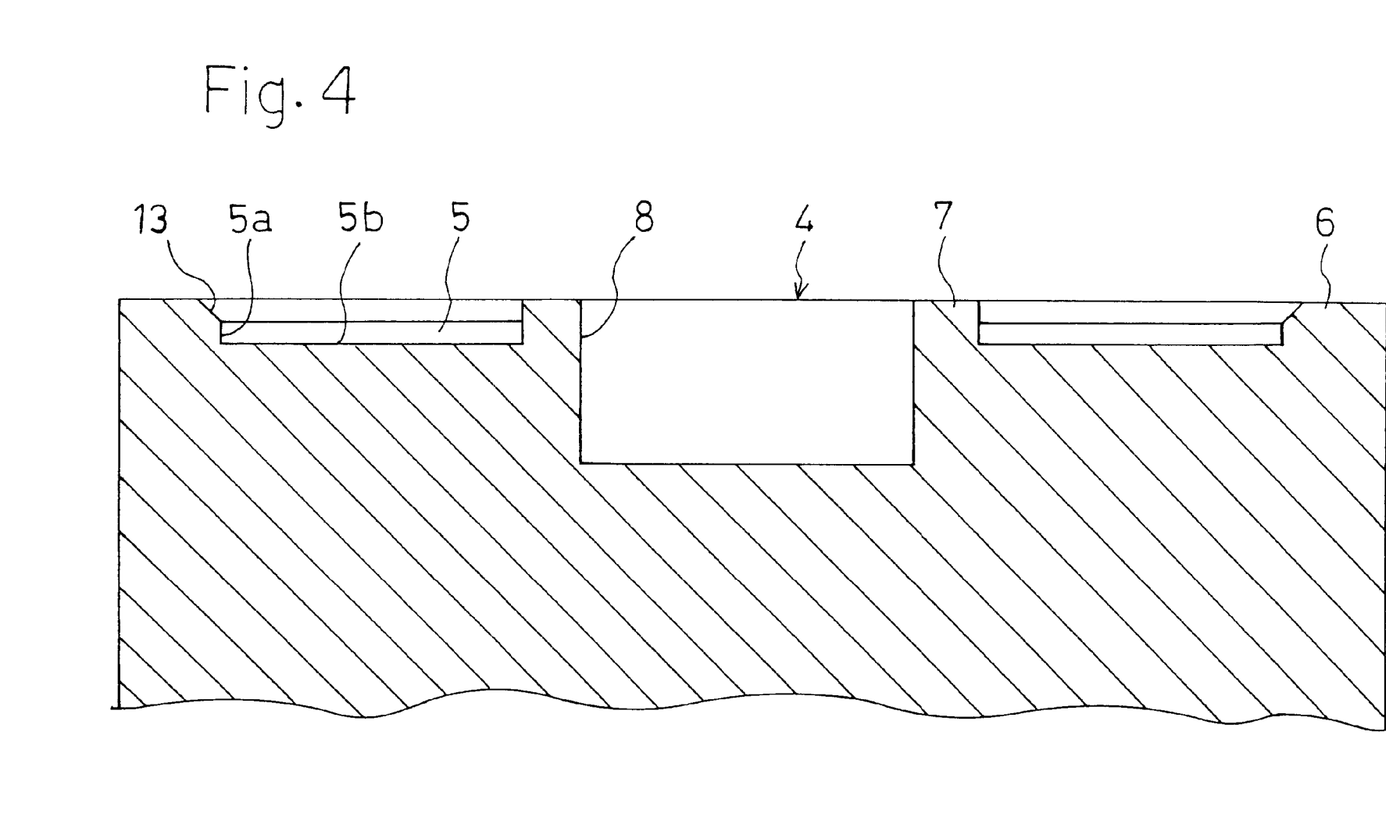
FIG. 4 is a section view showing main portions of another example of a lower rotary die which is used in the slotting method.

As the formation of the two or upper and lower slotted parts 10a, 10b from the outer peripheral portion 10 of the blank 1 as a result of pressing of the slotting roller die 11 is further advanced, a phenomenon that the material of the blank 1 is pulled and moved in the outer peripheral direction occurs. This causes the center hole 2 of the blank 1 to be easily deformed in a direction along which the diameter of the hole is increased. In order to prevent the deformation from occurring, preferably, the blank 1 is housed in the blank housing recess 5 in such a manner that at least a lower edge portion 100a of the outermost peripheral face 100 of the outer peripheral portion 10 of the blank abuts against the outer peripheral wall 5a of the blank housing recess 5 as shown in FIG. 1A, whereby the above-mentioned material moving phenomenon of the blank 1 is blocked. The outer peripheral wall 5a of the blank housing recess 5 may be formed as a straight wall which is perpendicular to an inner bottom face 5b of the recess. In order to enable the blank 1 to be easily fitted into the housing recess 5, alternatively, it is preferable to, as shown in FIG. 1A, form a tapered portion 13 over the whole length in the height direction of the outer peripheral wall 5a, or to, as shown in FIG. 4, form a tapered portion 13 in only the edge where the upper end of the outer peripheral wall 5a intersects with the roller die guiding face 6.

Figure 2A:
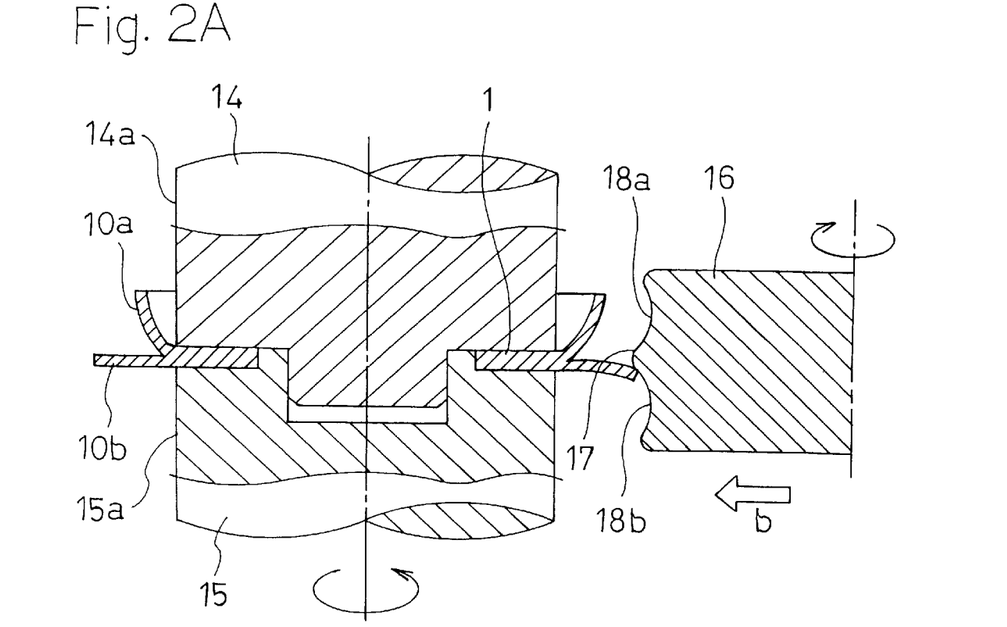
FIG. 2A is a diagram illustrating a state before an expandingly forming process in an expandingly forming step in the slotting method.
Figure 2B:
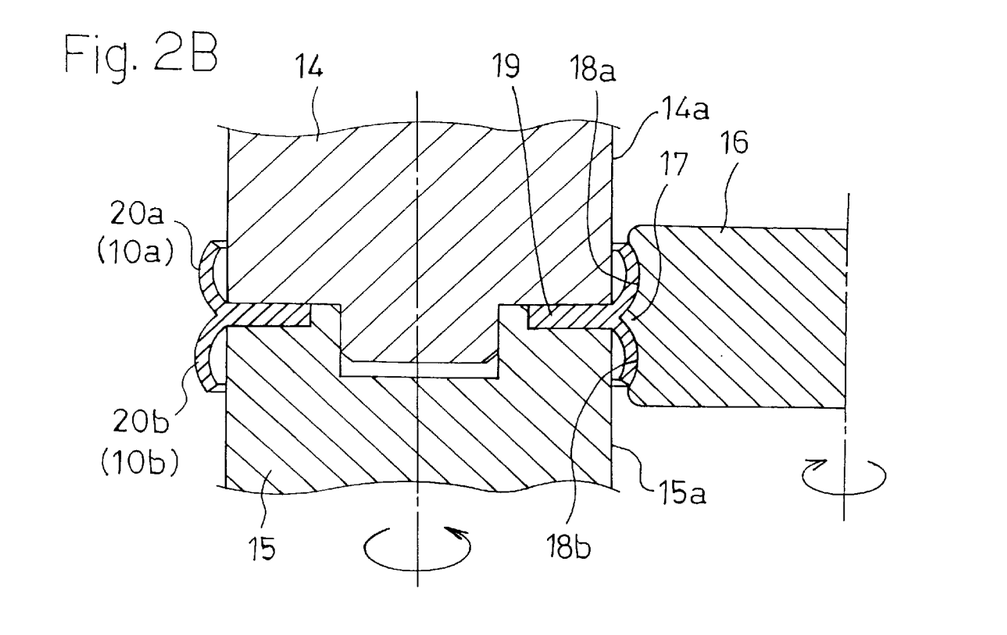
FIG. 2B is a diagram illustrating the operation of the expandingly forming step in the slotting method.

The blank 1 which has undergone the slotting process as described above is transferred to the next expandingly forming step. In the expandingly forming step, as shown in FIG. 2A, second upper and lower rotary dies 14, 15 having the same outer diameter, and an expandingly forming roller die 16 are used. The expandingly forming roller die 16 is formed so that an expanding blade portion 17 having a mountain-like section shape is protruded in the circumferential direction in an axial center portion of the outer peripheral face of the die, and grooves 18a, 18b having an arcuate section shape are formed respectively in upper and lower side in the axial direction of the expanding blade portion 17. The blank 1 is clampingly held between the second upper and lower rotary dies 14, 15 so that the upper and lower slotted parts 10a, 10b are outward protruded from outer peripheral faces 14a, 15a of the upper and lower rotary dies 14, 15. The expandingly forming roller die 16 is moved to approach the blank 1 as indicated by the arrow b in FIG. 2A, whereby, as shown in FIG. 2B, while the slotted parts 10a, 10b are slid in the grooves 18a, 18b, the slotted parts 10a, 10b are respectively pressed against the outer peripheral faces 14a, 15a of the upper and lower rotary dies 14, 15, to be straight expanded in upward and downward directions. As a result, a slotted product having a shape in which a web 19 configured by a part of the blank 1 that is clamped between the upper and lower rotary dies 14, 15, and rims 20a, 20b respectively configured by the slotted parts 10a, 10b that annularly expand toward both sides in the thickness direction of an outer peripheral portion of the web 19 is obtained.

Figure 3A:
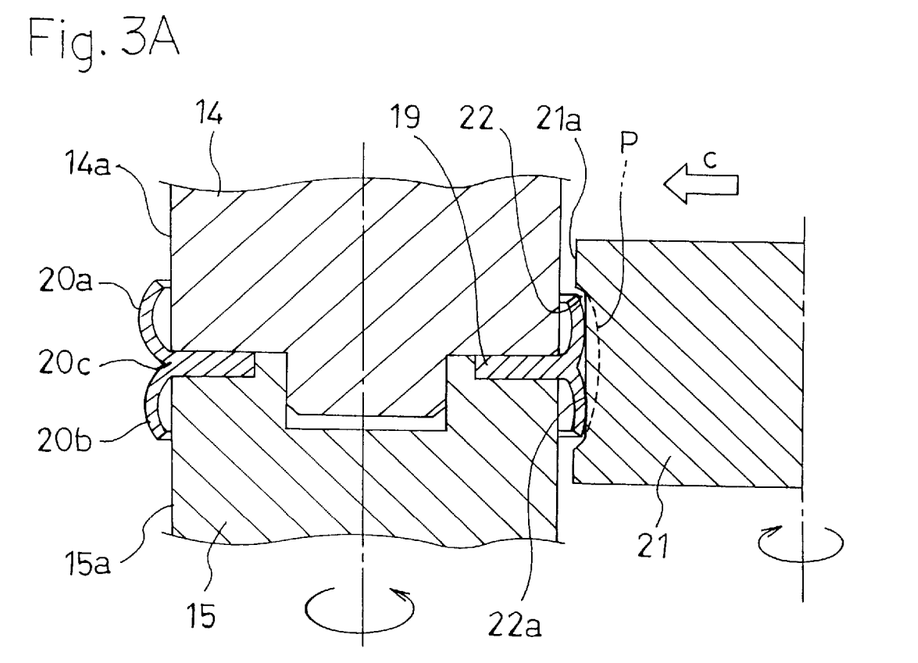
FIG. 3A is a diagram illustrating a state before a finishing process in a finishing step in the slotting method.
Figure 3B:
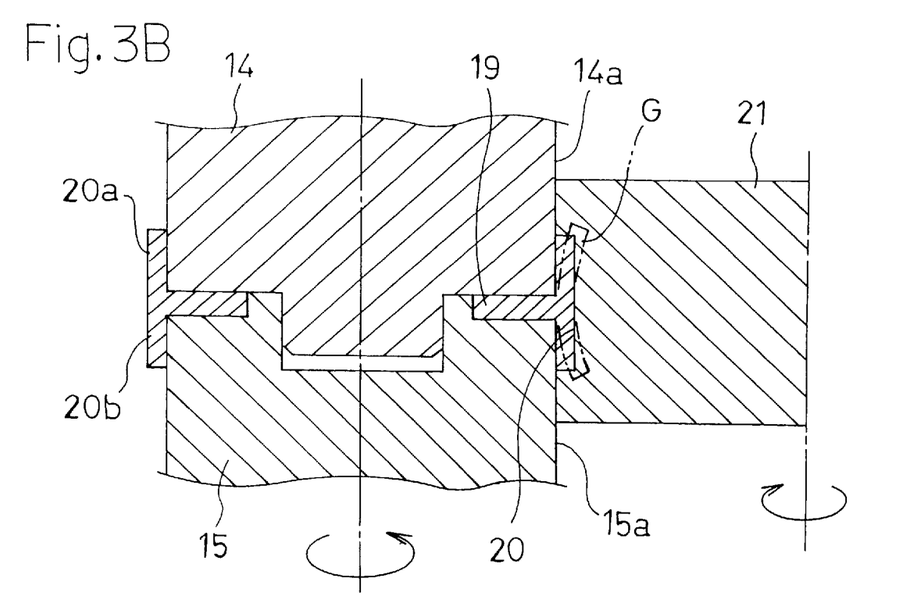
FIG. 3B is a diagram illustrating the operation of the finishing step in the slotting method.

In the finishing step, as shown in FIG. 3A, a finishing roller die 21 is used in which a width rectifying groove 22 is formed in an outer peripheral face 21a in the circumferential direction. The finishing roller die 21 is moved to approach the rims 20a, 20b as indicated by the arrow c in FIG. 3A, and the rims 20a, 20b are pressed further strongly by the width rectifying groove 22 against the outer peripheral faces 14a, 15a of the upper and lower rotary dies 14, 15, whereby the rims 20a, 20b can be finished so as to be straight and have a predetermined width dimension as shown in FIG. 3B. In the case where a recess 20c remains in the center of the rims 20a, 20b as shown in FIG. 3A even after the previous step, also a process of eliminating the recess 20c is performed. Preferably, the inner bottom face 22a of the width rectifying groove 22 is rounded to a radius of about 200 R (see the broken line P in FIG. 3A) rather than that the inner bottom face is formed as a perpendicular face parallel to the axis, because the rims 20a, 20b can be prevented from being warped by residual stress as indicated by the phantom line G (see FIG. 3B), so as to be finished straight in the width direction.

The slotted product in which the rims 20a, 20b are formed on the outer periphery of the web 19 in this way can be further processed in the next step in the following manner.

Figure 5:
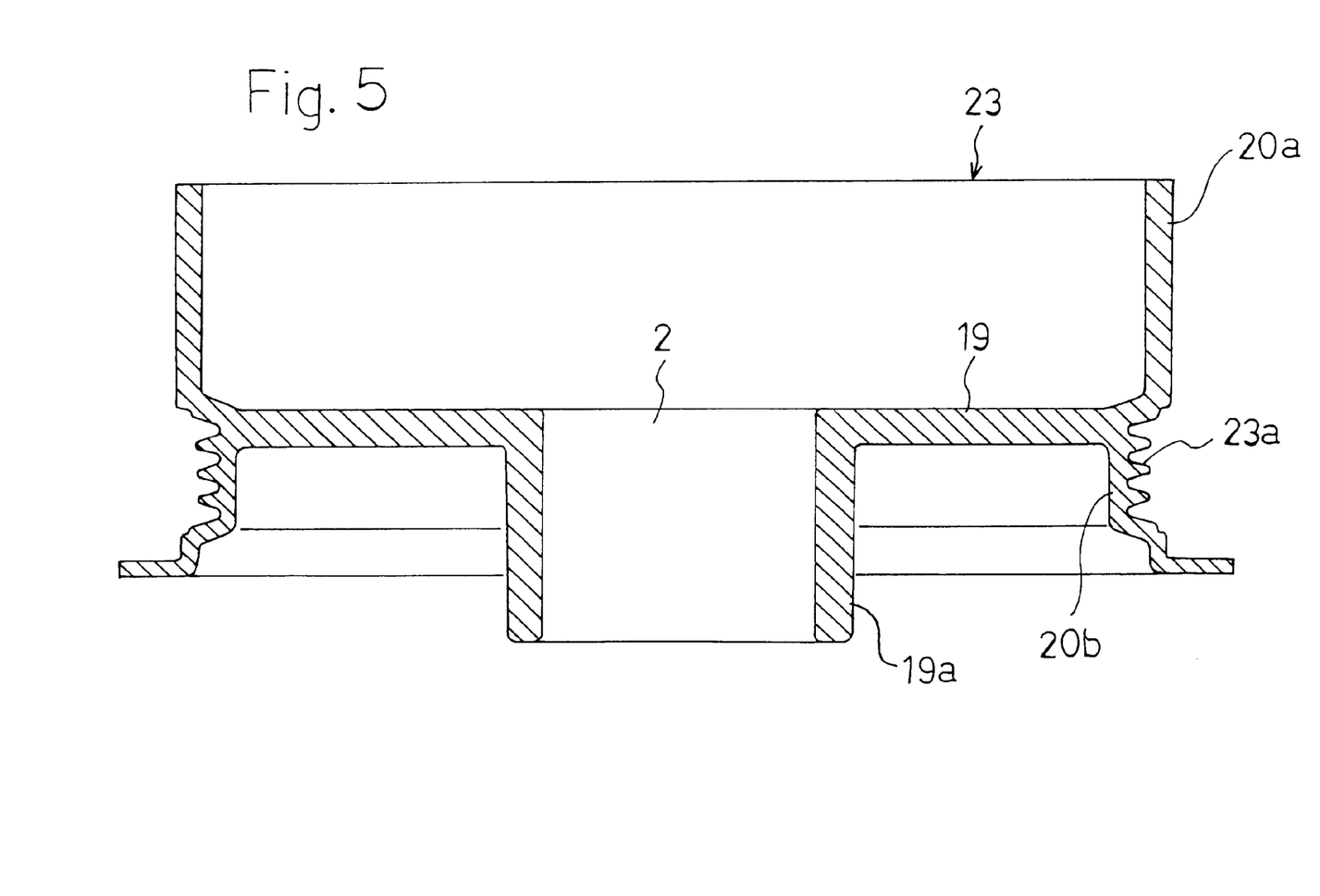
FIG. 5 is a section view of a metal sheet poly-V pulley which is obtained from a slotted product.
Figure 6:
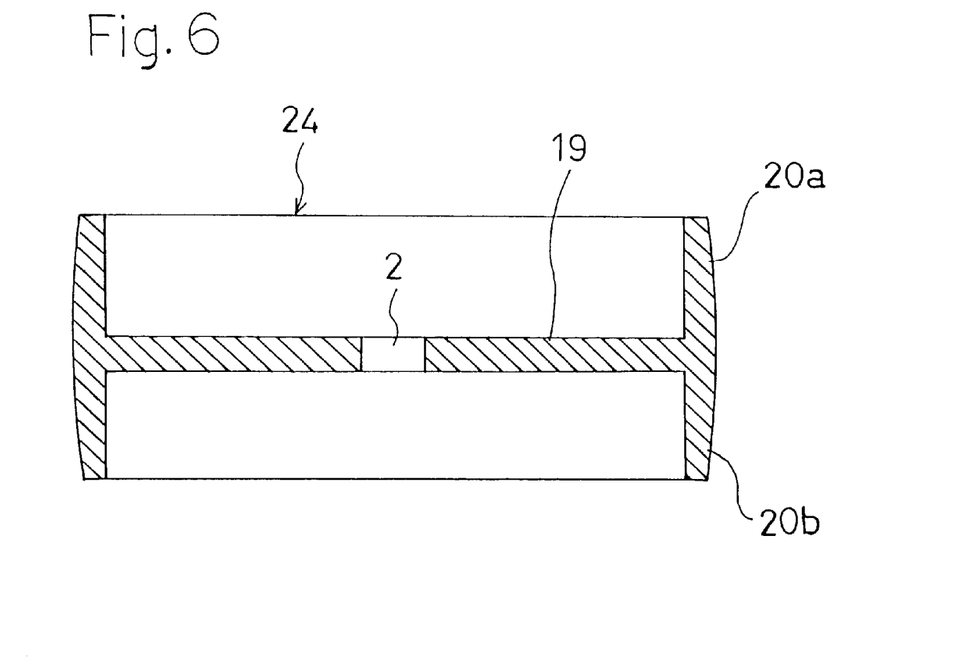
FIG. 6 is a section view of a metal sheet back face pulley which is obtained from a slotted product.
Figure 7:
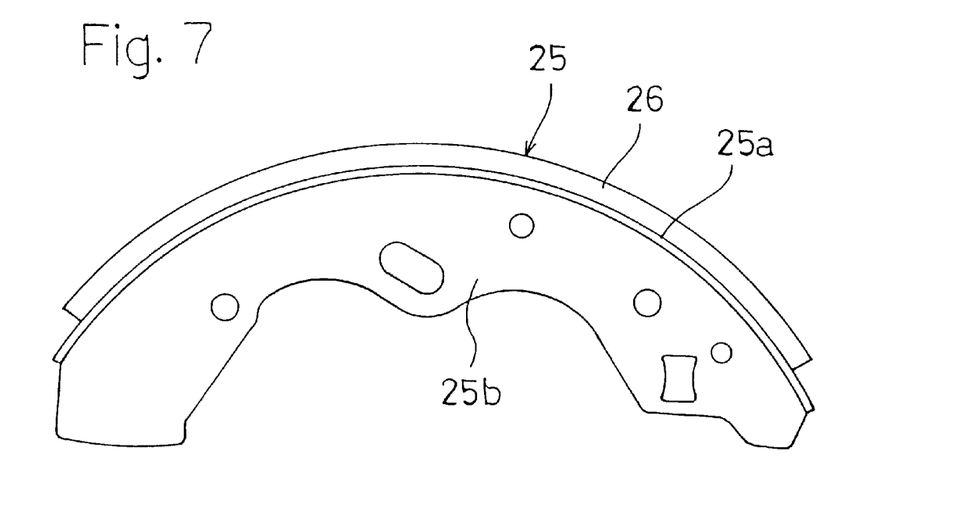
FIG. 7 is a section view of a metal sheet brake shoe which is obtained from a slotted product.

For example, a single V-groove may be formed in the outer periphery of the rims 20a, 20b to produce a metal sheet V-pulley (not shown), or poly-V grooves 23a may be formed in one of or both of the rims 20a, 20b as shown in FIG. 5 to produce a metal sheet poly-V-pulley 23. As a slotted product which is used for producing the metal sheet poly-V-pulley 23 shown in FIG. 5, a product in which a boss 19a surrounding the center hole 2 is formed in the center of the web 19 is used. Alternatively, in the above-mentioned slotted product, the outer peripheral faces of the rims 20a, 20b may be finished into a convex arcuate shape as shown in FIG. 6 so as to produce a metal sheet back face pulley 24. As shown in FIG. 7, furthermore, a metal sheet brake shoe 25 may be produced.

The case where the metal sheet brake shoe 25 which is shown in FIG. 7, and which is to be used in a drum brake is produced by using the above-mentioned slotted product will be described.

Figure 8:
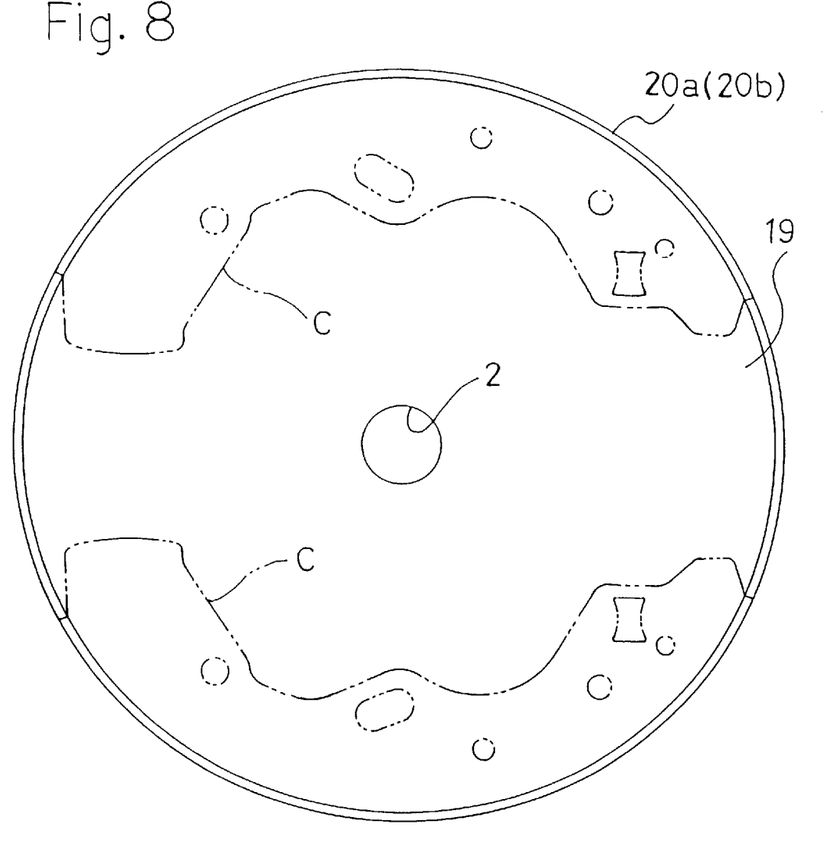
FIG. 8 is a front view illustrating a cutting step in steps of manufacturing the metal sheet brake shoe shown in FIG. 7.

As shown in FIG. 8, the above-mentioned slotted product in which the rims 20a, 20b are formed on the outer periphery of the web 19 is cut into a desired shape along the cutting plane line C by laser or plasma fusing. As a result, it is possible to easily obtain the metal sheet brake shoe 25 having a shoe rim 25a which has a partially arcuate shape configured by parts of the rims 20a, 20b as shown in FIG. 7, and a shoe rib 25b which is protruded from the inner periphery of the shoe rim 25a, and which is configured by a part of the web 19. As shown in FIG. 7, thereafter, a friction lining 26 is bonded to the outer face of the shoe rim 25a of the brake shoe 25. In order to enhance the bonding strength of the friction lining 26, a knurling process is preferably applied to the outer face of the shoe rim 25a before the process of bonding the friction lining 26.

Figure 9:
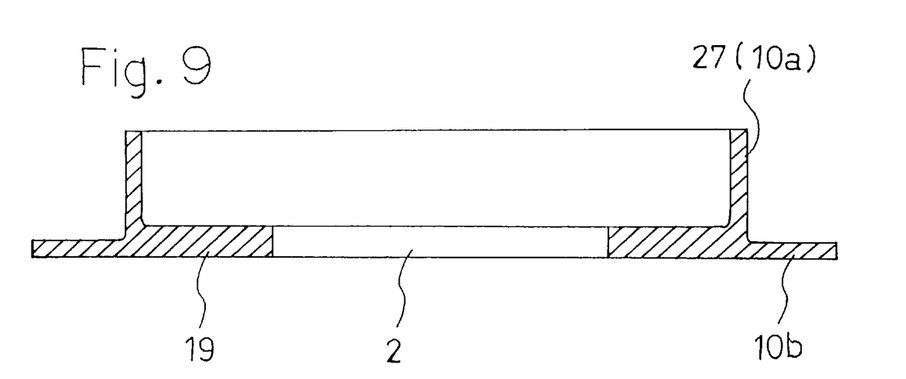
FIG. 9 is a section view showing another example of a slotted product.

The blank 1 which has been slotted as shown in FIG. 1B may be shaped so that, as shown FIG. 9, the upper slotted part 10a is perpendicular to the lower slotted part 10b, so as to be formed into a slotted product having a shape in which a boss 27 configured by the slotted part 10a is on one face of the web 19 having the center hole 2.

Industrial Applicability

According to the invention, during production of a metal sheet product such as a metal sheet v-pulley or a metal sheet brake shoe, slotting can be correctly easily performed at an arbitrary position in the thickness direction of an outer peripheral portion of a blank, so that the accuracy and quality of a metal sheet product can be improved.

What is claimed is:

1. A slotting method in which a disk-like metal blank is clampingly held between upper and lower rotary dies, a slotting roller die is pressed against an outer peripheral portion of said blank, and said outer peripheral portion of said blank is split into two parts in a thickness direction, wherein a blank housing recess a depth of which is smaller than a thickness of said blank is formed in an upper face of said lower rotary die on which said blank is to be placed, a roller die guiding face is formed horizontally and continuously with an outer periphery of an upper end of an outer peripheral wall of said blank housing recess to be lower in level than an upper face of said blank in the said blank housing recess, said upper rotary die is formed to have an outer diameter which is smaller than an outer diameter of said lower rotary die, thereby allowing an upper face of said outer peripheral portion of said blank in said blank housing recess to be exposed, said slotting roller die has a blade edge on an outer periphery of said die, and, while said slotting roller die is rotated in synchronization with said blank about a roller axis which is inclined with respect to a rotation axis of said upper and lower rotary dies, said blade edge is slid on said roller die guiding face in an inward radial direction to be pressed against said outer peripheral portion of said blank which is protruded from said blank housing recess, whereby said outer peripheral portion is slit into two parts in the thickness direction.

2. A slotting method according to claim 1, wherein said blank is housed in said blank housing recess in such a manner that at least a lower edge portion of an outermost peripheral face of said outer peripheral portion of said blank abuts against said outer peripheral wall of said blank housing recess.

3. A slotting method in which a disk-like metal blank is clampingly held between upper and lower rotary dies, a slotting roller die is pressed against an outer peripheral portion of said blank, and said outer peripheral portion of said blank is split into two parts in a thickness direction, wherein a blank housing recess a depth of which is smaller than a thickness of said blank is formed in an upper face of said lower rotary die on which said blank is to be placed, a roller die guiding face is formed horizontally and continuously with an outer periphery of an upper end of an outer peripheral wall of said blank housing recess to be lower in level than an upper face of said blank in the said blank housing recess, said upper rotary die is formed to have an outer diameter which is smaller than an outer diameter of said lower rotary die, thereby allowing an upper face of said outer peripheral portion of said blank in said blank housing recess to be exposed, said slotting roller die has a blade edge on an outer periphery of said die, and, while said slotting roller die is rotated in synchronization with said blank about a roller axis which is inclined with respect to a rotation axis of said upper and lower rotary dies, said blade edge is slid on said roller die guiding face in an inward radial direction to be pressed against said outer peripheral portion of said blank which is protruded from said blank housing recess, whereby said outer peripheral portion is slit into two parts in the thickness direction to form upper and lower slotted parts, said blank is then clampingly held between second upper and lower rotary dies so that said upper and lower slotted parts are outward protruded from outer peripheral faces of said upper and lower rotary dies, and an expanding blade portion of an expandingly forming roller die is pressed against said slotted parts, said expanding blade portion being formed on an outer peripheral face in a circumferential direction, to straight expand said slotted parts in upward and downward directions.

4. A slotting device comprising: upper and lower rotary dies which clampingly hold a disk-like metal blank; and a slotting roller die which, while being rotated in synchronization with said blank, presses a blade edge against an outer peripheral portion of said blank to slit said outer peripheral portion into two parts in a thickness direction, wherein a blank housing recess a depth of which is smaller than a thickness of said blank is formed in an upper face of said lower rotary die on which said blank is to be placed, a roller die guiding face is formed horizontally and continuously with an outer periphery of an upper end of an outer peripheral wall of said blank housing recess to be lower in level than an upper face of said blank in said blank housing recess, said upper rotary die is formed to have an outer diameter which is smaller than an outer diameter of said lower rotary die, to allow an upper face of said outer peripheral portion of said blank in said blank housing recess to be exposed, said slotting roller die has a blade edge on an outer periphery of said die, and, while said slotting roller die is rotated in synchronization with said blank about a roller axis which is inclined with respect to a rotation axis of said upper and lower rotary dies, said blade edge is slid on said roller die guiding face in an inward radial direction to be pressed against said outer peripheral portion of said blank which is protruded from said blank housing recess.

5. A method of, by using a disk-like metal blank, manufacturing a metal sheet brake shoe having a shoe rim which has a partially arcuate shape, and a shoe rib which is protruded from an inner periphery of said shoe rim, wherein said method includes:

a slotting step of clampingly holding a disk-like metal blank between upper and lower rotary dies, and pressing a slotting roller die against an outer peripheral portion of said blank, thereby splitting said outer peripheral portion of said blank into two parts in a thickness direction, and, in this step, a blank housing recess a depth of which is smaller than a thickness of said blank is formed in an upper face of said lower rotary die on which said blank is to be placed, a roller die guiding face is formed horizontally and continuously with an outer periphery of an upper end of an outer peripheral wall of said blank housing recess to be lower in level than an upper face of said blank in said blank housing recess, said upper rotary die is formed to have an outer diameter which is smaller than an outer diameter of said lower rotary die, to allow an upper face of said outer peripheral portion of said blank in said blank housing recess to be exposed, said slotting roller die has a blade edge on an outer periphery of said die, and, while said slotting roller die is rotated in synchronization with said blank about a roller axis which is inclined with respect to a rotation axis of said upper and lower rotary dies, said blade edge is slid on said roller die guiding face in an inward radial direction to be pressed against said outer peripheral portion of said blank which is protruded from said blank housing recess, whereby said outer peripheral portion is slit into two parts in the thickness direction to form upper and lower slotted parts;

an expandingly forming step in which said blank is clampingly held between second upper and lower rotary dies so that said upper and lower slotted parts are outward protruded from outer peripheral faces of said upper and lower rotary dies, and an expanding blade portion of an expandingly forming roller die is pressed against a portion between said slotted parts, said expanding blade portion being formed on an outer peripheral face in a circumferential direction, to straight expand said slotted parts in upward and downward directions, thereby shaping a web which is configured by a part of said blank clamped between said upper and lower rotary dies, and rims which are configured respectively by said slotted parts that expand toward both sides in a thickness direction of an outer peripheral portion of said web; and a step of cutting said web and said rims into a required shape, thereby forming a brake shoe having a shoe rim which has a partially arcuate shape, and a shoe rib which is protruded from an inner periphery of said shoe rim.

* * * * *